United States Patent Office 3,215,655
Patented Nov. 2, 1965

3,215,655
SPIRIT VARNISH COMPRISING SHELLAC AND A UREA-FORMALDEHYDE RESIN AND PROCESS FOR PREPARING SAME
John J. Clancy, Westwood, John Drougas, Arlington, and David W. Lovering, Needham, Mass., assignors to Arthur D. Little, Inc., Cambridge, Mass., a corporation of Massachusetts
No Drawing. Filed Aug. 16, 1961, Ser. No. 131,738
7 Claims. (Cl. 260—24)

This invention relates to a new type surface coating and more particularly to a new spirit varnish which is a modified shellac.

Shellac is a natural resin and it has been known for many years as a good surface coating, being generally applied as an alcohol solution or an emulsion. Shellac has many advantages—it is easily handled, readily applied, and has good brushing qualities. It may be laid down in a good thickness, has good grain filling properties, and exceptional adhesion. Moreover, shellac dries hard and grain free in a very short time. However, this natural resin does possess certain inherent disadvantages. Among these is a lack of resistance to severe abrasion, that is it leaves something to be desired in abrasion resistance. Moreover, shellac is not resistant to water and has a tendency to spot. Because of the inherent advantages of shellac, it would be desirable to be able to modify shellac to make it more abrasion resistant and more water resistant while at the same time retaining the desirable properties associated with this natural resin, particularly the properties which contribute to achieving a hard, fast-drying film from the spirit varnish formulated with shellac.

It is, therefore, an object of this invention to provide a new spirit varnish which is primarily shellac and which is highly resistant to abrasion and water-spotting. It is another object of this invention to provide a spirit varnish of the character described which still retains all of the desirable properties associated with shellac; that is, good adhesion and the ability to set up rapidly and to dry grain free. It is yet another object of this invention to provide a spirit varnish which is a mixture of a natural and synthetic resin which cures rapidly at room temperature to a hard finish, allowing consecutive coatings to be applied at intervals of two hours or less and permitting sanding between coatings. It is still another object of this invention to provide a spirit varnish which may be premixed and which has a good shelf life. These and other objects will become apparent in the following description of this invention.

We have found that a spirit varnish of the character described can be made by incorporating in a shellac solution a minor portion (10–40% by weight) of a urea-formaldehyde resin. An anhydrous organic liquid which is a solvent for both the shellac and the urea-formaldehyde resin serves as the solvent for the varnish. An acid catalyst is incorporated in the spirit varnish to cause it to cure rapidly and set up at room temperature to a hard coating. The resulting coating adheres well to the substrate on which it is deposited, it does not embrittle with age, and it cures rapidly at room temperatures with exceptional abrasion and water resistance. By choice of catalyst, it is possible to premix the spirit varnish to give a coating material having a shelf life of nine months or more.

The varnish components, solvent, and catalyst must be carefully chosen, as will be apparent from the following description of each of these components.

The shellac used in compounding the spirit varnish of this invention should be essentially free of wax; i.e., should contain no more than about 0.1% wax by weight. It has been found that wax will precipitate with the addition of the urea-formaldehyde resin; and, therefore, any appreciable quantity of wax cannot be tolerated. The shellac to be used should also be substantially free of moisture, preferably containing no more than about 1.2% by weight. The moisture content of the spirit varnish as compounded and packaged should not be higher than about 2% by weight. Above this quantity the spirit varnish is no longer stable for any extended period and, therefore, does not exhibit a good shelf life. It will, therefore, be appreciated that the moisture content of the shellac and of the solvent or solvents used should be so balanced as to minimize the moisture content of the spirit varnish and maintain it below the 2% level. Of course, if one of these ingredients is extremely low in moisture, then the other may contain relatively more moisture so long as the moisture content of the varnish is maintained below the prescribed level of 2%.

The shellac used in the spirit varnish should preferably be free of any appreciable quantities of combined chlorine, and it should also be hard and have inherently as good abrasion and water resistance characteristics as is possible to obtain in the natural resin.

The amount of shellac on a solids basis should range from about 60 to about 90% by weight of the total solids content. For floor coverings a range of from about 65 to 75% by weight is better, and about 70% by weight is preferred. When the shellac is present in an amount below 60%, the finally cured coating is excessively brittle; while if more than 90% shellac is used, the abrasion and water resistance of the resulting coating is materially lessened.

The urea-formaldehyde component of the spirit varnish of this invention is a condensation product of urea and formaldehyde made in accordance with accepted practice. This resin component must be compatible with the shellac solvent and with the shellac itself. This means that the urea-formaldehyde must be soluble in or compatible with the anhydrous lower aliphatic alcohols without producing any fluff or precipitate. To make urea-formaldehyde resin soluble in these alochols, it is customary to combine the urea-formaldehyde condensate with an alcohol such as propyl, butyl, or octyl to form an ether-type compound. Formed in this manner, the urea-formaldehyde resin suitable for the practice of this invention should also be capable, through the use of an appropriate catalyst, of curing rapidly at room temperature. A fast-cure varnish may be defined as one having a two-hour recoat time and one which also permits sanding between these two-hour coats without appreciably clogging the sandpaper.

The amount of shellac in the varnish has been defined above as ranging between 60 and 90%. The corresponding amount of urea-formaldehyde will, therefore, be between about 40 and 10% by weight based on the total solids content, with the preferred amount being about 30%. In order to introduce the urea-formaldehyde resin into the shellac solution, it is preferable to use a urea-formaldehyde resin prepared in a solvent which is miscible with the shellac solvent. This is generally done by dissolving a urea-formaldehyde resin in a small amount of an organic liquid, such as a mixture of aromatic hydrocarbons; e.g., xylene, toluene and the like and a lower aliphatic alcohol. Thus, solvents used in the preparation of the urea-formaldehyde solution should be essentially anhydrous.

It may be noted at this point that of the formaldehyde-condensation resins known, only urea-formaldehyde is suitable for incorporation in the shellac-based spirit varnish of this invention, for only urea-formaldehyde is capable of contributing abrasion and water resistance to shellac without impairing the advantages to be realized from the use of shellac. This is particularly true with respect to the ability of shellac to cure rapidly and set up as a coating which is not unduly brittle. For example, a melamine-formaldehyde resin can be incorporated in shellac, but the cure time is materially increased.

The catalyst used must first be capable of rapidly curing the urea-formaldehyde in the spirit varnish when exposed to the air in thin films and at room temperature. It is also preferably a catalyst which exhibits good stability before and after addition to the spirit varnish, permitting the ready-mixed spirit varnish to be stored in a closed container for at least nine months without effecting any appreciable amount of esterification of the shellac or premature curing of the urea-formaldehyde. However, if the spirit varnish is to be mixed and used within a reasonably short period of time, the catalyst need not possess long stability.

Catalysts suitable for room temperature rapid curing of the spirit varnish of this invention must be strongly acidic. Preferred catalysts for incorporating in the premixed varnish having a long shelf life are esters of the phosphoric acids. A particularly well-suited catalyst of this type is the dimethyl ester of pyrophosphoric acid. This catalyst, when used in a 70/30 shellac urea-formaldehyde varnish, effects cure of the varnish at normal room temperature in a sufficiently short period of time to permit recoating in two hours with sanding between coats.

Other strong acid catalysts, including the strong mineral acids such as phosphoric acid, hydrochloric, nitric, and sulfuric, may also be used, as well as the strong organic acids such as paratoluene sulfonic acid and the like. Other acid catalysts which are suitable are those materials which liberate acids when exposed to atmospheric conditions, as well as the so-called Lewis acids which include, but are not limited to, aluminum chloride, boron trifluoride, sulfur dioxide and the like. Some strong acids, or acid-liberating compounds, can effect very rapid cure of the spirit varnish. For example, when an aluminum chloride catalyst was used, it was possible to formulate a spirit varnish which became dry to the touch within 10 minutes and permitted the application of a second coat within 20 minutes.

The amount of catalyst incorporated into our spirit varnish may vary over a wide range, and it generally will be between about 2 and 13% by weight, based upon the solid weight of the urea-formaldehyde present in the spirit varnish. The amount of catalyst should be regulated with respect to the effectiveness of the catalyst used. For example, the preferred range for the dimethyl ester of pyrophosphoric acid is between 7 and 13% by weight of the synthetic resin.

For most applications, an amount equivalent to about 10% by weight of the urea-formaldehyde present is preferred. In general, somewhat faster cures can be effected with greater amounts of catalysts. With catalyst concentrations above 13%, even faster cures can be realized; but the resulting varnish is less stable, more difficult to apply, and has less water resistance.

The solvent used to form the coating solution must be essentially anhydrous. That is, it must not contain more than about 0.1% water. As pointed out above in the definition of a suitable shellac, it is necessary that the finished varnish solution contain less than 2% by weight moisture. Therefore, the quantity of moisture in the solvent and in the shellac must be balanced to attain this minimum quantity of moisture in the finished varnish. The solvent is preferably a lower aliphatic alcohol or a mixture of lower aliphatic alcohols, containing some aromatic hydrocarbons introduced in the urea-formaldehyde solution. An anhydrous denatured ethyl alcohol has been found to be the best suited for the varnish. It will be appreciated that since the spirit varnish of this invention must be applied frequently in confined areas and in the presence of human beings, either by a brush or other suitable means, it is highly desirable that the solvent, as well as the urea-formaldehyde, does not have a disagreeable odor, is not otherwise disagreeable to apply, and is within allowable working limits of toxicity. For this reason, the lower aliphatic alcohols, and particularly ethyl alcohol, is preferred.

If the spirit varnish is to be applied by brushing, then the solutions should have a solids content ranging from about 30 to 38% by weight, with a preferred solids content being about 34%.

However, other concentrations may be employed for other methods of application. As an example, more dilute concentrations (e.g., as low as 5%) may be applied by spraying, dipping, or roller coating. The upper limit will be determined by the viscosity which can be tolerated in the method of application used.

The solvents used should also have an acceptable evaporation rate; that is, they should evaporate rapidly enough to permit two-hour recoatings, but not so rapidly that they are not acceptable for brushing on the spirit varnish.

This invention may be further described with reference to the following examples, which are meant to be illustrative and not limting.

Example 1

Thirty grams of a shellac having a moisture content of about 1.2% and being essentially wax-free and chlorine-free were dissolved in 55.7 grams of anhydrous denatured ethyl alcohol. The alcohol contained less than 0.1% moisture. Into the resulting solution was added 25 grams of a urea-formaldehyde solution which was a 50% (solids basis) solution of the resin in a xylol-propanol solvent, the solvents being present in a weight ratio of 3 to 7 respectively. After thorough mixing of the two liquids, 2.5 grams of a 50% solids solution of the dimethyl ester of pyrophosphoric acid was added as the catalyst. The resulting spirit varnish was thoroughly mixed and then placed in air-tight containers and stored. The resulting spirit varnish had a moisture content of less than 2% by weight and it exhibited a shelf life of over nine months.

To evaluate this varnish, it was brush applied to a wooden floor. It dried at room temperature within two hours and gave good resistance to abrasion in less than 24 hours. Moreover, the resulting varnished floor showed excellent water resistance. Water resistance is measured by placing a water spot on the coated surface and placing a watch glass over the water spot. The spot is observed at various times to determine how long is required to form a permanent water spot. Using this test, a normal shellac coating required about two and one-half hours, while the spirit varnish of this example after standing overnight (about 18 hours) still did not exhibit a permanent water spot. When the spirit varnish of this invention was brushed on a floor and abrasion was applied to it by walking over it, it was found to outlast a conventional nitro-cellulose lacquer specifically formulated for floor finishes, as well as unmodified shellacs, by a factor of about two to three times. Moreover, the spirit varnish of this invention was not embrittled over a period of time. This means, then, in effect, that our spirit varnish possesses both abrasion resistance and water resistance comparable with the best oil-modified urethanes or spar varnishes.

Example 2

A solution of a shellac in anhydrous denatured ethyl alcohol was made up to have a solids content of 35%. Into this was added sufficient urea-formaldehyde solution (50% solids concentration) in xylol-propanol solvent to give an overall varnish having a weight ratio of 65% shellac to 35% urea-formaldehyde. After thorough mixing of these solutions, sufficient aluminum chloride in dry form was added in an amount equivalent to 7.7% by weight of the urea-formaldehyde resin. The resulting varnish was brushed on a floor and it was found that it dried to the touch within 10 minutes and that a second coat could be applied after 20 minutes. The shelf life of this particular varnish was about two weeks.

It will be seen from the above two examples that it is possible by choice of catalyst to determine the stability and shelf life of the spirit varnish of this invention. Thus, if it is desired to have a varnish which can be stored for nine months or more, a catalyst such as the dimethyl ester of pyrophosphoric acid will be used; whereas if it is desired to mix the varnish and use shortly thereafter, a catalyst such as aluminum chloride or a free strong acid may be incorporated, thus imparting to the varnish a very fast cure. It is, of course, also within the scope of this invention to provide the components of the varnish in two parts; that is, to provide the solution of the shellac and the urea-formaldehyde as one part and the catalyst as another part. These, then, may be mixed anytime before use.

*Example 3*

A spirit varnish was made up in accordance with Example 1, except that a xylol-butanol solvent in 1 to 1 proportions was substituted for the xylol-propanol solvent of Example 1. The resulting spirit varnish showed the same characteristics as that of Example 1, except that it was less desirable as a floor finish since the solvent odor was less pleasing than that of Example 1.

*Example 4*

A spirit varnish was compounded as in Example 1, except that the proportions of the components were adjusted so the amount of shellac present in the final varnish amounted to about 60% by weight, while the urea-formaldehyde amounted to about 40% by weight of the total solids content. The catalyst used was pyrophosphoric acid, present in an amount equal to 10% by weight of the urea-formaldehyde resin. When this varnish was applied to a floor, it cured very rapidly; but after thorough drying, it showed a tendency to be slightly brittle. It was extremely water and abrasion resistant.

*Example 5*

A spirit varnish was made as in Example 1, except that the proportions of the components were adjusted so the shellac was present in an amount equivalent to about 90% by weight of total solids content and the urea-formaldehyde was present in an amount equivalent to about 10% by weight. The catalyst was the dimethyl ester of pyrophosphoric acid, and it was present in an amount equivalent to 10% by weight of the urea-formaldehyde used. The resulting spirit varnish was coated upon a wood substrate; and it exhibited somewhat less water and abrasion resistance than that in Example 1, but it dried and cured very rapidly.

*Example 6*

A spirit varnish was made by combining a 35% solution (solids basis) of a shellac in anhydrous denatured ethyl alcohol with a 50% solution (solids basis) of a melamine-formaldehyde resin in a xylol-butanol (1:4) solvent. Sufficient catalyst in the form of the dimethyl ester of pyrophosphoric acid was then incorporated in the solution to be equivalent to 10% by weight of the melamine-formaldehyde resin present. The resulting spirit varnish exhibited slow drying properties; that is, it was not possible to recoat within two hours and sand between the coatings without appreciable gumming of the sand paper.

The above description shows that this invention provides a new and novel spirit varnish which has the advantages associated with the natural resin shellac and which at the same time has improved abrasion resistance and water resistance. Thus, it is possible to provide a shellac-based spirit varnish which may be used on surfaces such as floors and which can be applied rapidly using a number of coats with standing between. The improved resistance to abrasion is, moreover, attained without any undue embrittling of the final coating.

Various modifications of this invention will occur to those skilled in the art without departing from the essential features of this invention, and it is meant to include these within the scope of this invention.

We claim:

1. A spirit varnish consisting essentially of shellac, a urea-formaldehyde resin which has been condensed with an aliphatic alcohol, and a strong acid catalyst for said urea-formaldehyde resin in a solvent for said shellac and said resin comprising a lower aliphatic alcohol, the resulting solution having a moisture content of less than 2% by weight; said shellac being essentially free of wax and present in an amount equivalent to between about 60 and 90% by weight based upon total solids content; said urea-formaldehyde resin present in an amount equivalent to between about 10 and 40% by weight; and said acid catalyst being capable of rapidly curing said varnish in film form at room temperatures and present in an amount equivalent to between about 2 and 13% by weight of said urea-formaldehyde resin.

2. Spirit varnish in accordance with claim 1 wherein said acid catalyst is a material which liberates a strong acid when exposed to the atmosphere.

3. Spirit varnish in accordance with claim 1 wherein said catalyst is the dimethyl ester of pyrophosphoric acid.

4. A spirit varnish consisting essentially of from about 65 to 75% by weight of shellac, from about 25 to 35% by weight of a urea-formaldehyde resin which has been condensed with an aliphatic alcohol, and from about 7–13% by weight of a strong acid catalyst based upon the weight of said urea-formaldehyde resin, dissolved in a substantially anhydrous organic solvent comprising a lower aliphatic alcohol; said acid catalyst being capable of curing said varnish in film form at room temperatures.

5. Spirit varnish in accordance with claim 4 wherein said solvent is a mixture of a lower aliphatic alcohol and an aromatic hydrocarbon.

6. Spirit varnish in accordance with claim 4 wherein the combined concentration of said shellac and said urea-formaldehyde in said solution ranges from about 30 to 38% by weight of said varnish.

7. Process for making a spirit varnish which is characterized as having good resistance to abrasion and water and being capable of rapidly setting up to a hard film at room temperature, comprising the steps of dissolving shellac which is essentially free of wax and of moisture in a lower aliphatic alcohol, adding to the resulting shellac solution a urea-formaldehyde resin which has been condensed with an aliphatic alcohol dissolved in a solvent which is a mixture of a lower aliphatic alcohol and an aromatic hydrocarbon and incorporating into the resulting resins solution a strong acid catalyst for said urea-formaldehyde resin; said shellac being present in said resins solution in an amount equivalent to between about 60 and 90% by weight of total solids and said catalyst being present in an amount equivalent to between about 2 and 13% by weight of said urea-formaldehyde on a solids basis; the resulting spirit varnish having a moisture content of less than 2% by weight.

References Cited by the Examiner

UNITED STATES PATENTS

| | | | |
|---|---|---|---|
| 1,460,606 | 7/23 | Ripper | 260—24 |
| 2,311,911 | 2/43 | Swain | 260—24 |
| 2,430,950 | 11/47 | Rothrock | 260—70 |
| 2,712,533 | 7/55 | Mitchell | 260—24 |

OTHER REFERENCES

Chatfield: Varnish Constituents, 1953, Leonard Hill Limited, London, pp. 347, 352.

WILLIAM H. SHORT, *Primary Examiner.*

M. STERMAN, *Examiner.*